US007698479B2

(12) United States Patent
Georgalas et al.

(10) Patent No.: US 7,698,479 B2
(45) Date of Patent: Apr. 13, 2010

(54) USER INTERFACE TO A DATA STORAGE SYSTEM AND RULE STORE

(75) Inventors: Nektarios Georgalas, Ipswich (GB); Michael A Fisher, Ipswich (GB); Clare Bradford, Ipswich (GB)

(73) Assignee: British Telecommunications public limited company, London (GB)

( * ) Notice: Subject to any disclaimer, the term of this patent is extended or adjusted under 35 U.S.C. 154(b) by 559 days.

(21) Appl. No.: 10/511,905

(22) PCT Filed: May 8, 2003

(86) PCT No.: PCT/GB03/01973

§ 371 (c)(1),
(2), (4) Date: Oct. 20, 2004

(87) PCT Pub. No.: WO03/096221

PCT Pub. Date: Nov. 20, 2003

(65) Prior Publication Data

US 2005/0216498 A1 Sep. 29, 2005

(30) Foreign Application Priority Data

May 8, 2002 (EP) .................................. 02253228

(51) Int. Cl.
G06F 3/00 (2006.01)
G06F 5/00 (2006.01)
G06F 17/00 (2006.01)
G06F 17/30 (2006.01)

(52) U.S. Cl. ........................... 710/36; 707/10; 707/102

(58) Field of Classification Search .................. 710/36; 707/1–5, 102, 10

See application file for complete search history.

(56) References Cited

U.S. PATENT DOCUMENTS

| 6,327,618 | B1 * | 12/2001 | Ahlstrom et al. ............ 709/223 |
| 6,754,704 | B1 * | 6/2004 | Prorock ...................... 709/224 |
| 7,019,740 | B2 * | 3/2006 | Georgalas .................... 345/418 |
| 7,398,252 | B2 * | 7/2008 | Neofytides et al. ............ 705/64 |
| 2001/0051942 | A1 * | 12/2001 | Toth ............................... 707/3 |

OTHER PUBLICATIONS

Nektarios Georgalas, A Framework that uses Repositories for Information Systems and Knowledge Integration, 1999, IEEE Computer Society, p. 1-12.*

(Continued)

Primary Examiner—Niketa I Patel
Assistant Examiner—Brooke J Dews
(74) Attorney, Agent, or Firm—Nixon & Vanderhye P.C.

(57) ABSTRACT

This invention relates to a method of and an apparatus for providing an interface between a client and one or more data storage systems. Existing approaches to the management of multiple, distributed heterogeneous data storage systems are deficient in that they are inflexible to change. To alleviate these deficiencies there is provided a method of providing an interface between a client (307) and one or more data storage systems (309). The method comprises the steps of receiving a request from a client (307), searching, in a rule store populated by modifiable human-readable rules each specifying a handler for use in responding to client requests, for a human readable rule and providing the interface by activating the handler specified in the human readable rule to communicate with the data storage systems.

19 Claims, 8 Drawing Sheets

OTHER PUBLICATIONS

Genoveva Vargas-Solar et al., "Active Services for Federated Databases", Proceedings of the 2000 ACM Symposium on Applied Computing 2000, 'Online' 2000, pp. 356-360, XP002233401, Como, Italy, ISBN: 1-58113-240-9.

Chakravarthy et al., "ECA Rule Processing in Distributed and Heterogeneous Environments", Distributed Objects and Applications 1999. Proceedings of the International Symposium on Edinburgh, UK Sep. 5-6, 1999, Los Alamitos, CA, USA, IEEE Comput. Soc., US, Sep. 5, 1999, pp. 330-339, XP010352161.

Shi-Ming Huang et al., "The Activation of Active Rules in the Heterogeneous Database Systems", Systems, Man, and Cybernetics, IEEE Conferences, Online!, vol. 2, Oct. 14-17, 1996, pp. 998-1003, XP002233402, Beijing, China, Retrieved from the Internet: URL:http://ieeexplore.ieee.org/ie13/4232/12290/00571216. pdf?isNumber=12290&prod=IEEE+CNF&arnumber=571216 &arSt=998&ared=1003+vol.2&arAuthor=Shi-Ming+Huang%3B+Jung-Kwi+Liu%3B, retrieved on Mar. 3, 2003.

Koschel et al., "Configurable Event Triggered Services for CORBA-based Systems", Enterprise Distributed Object Computing Workshop, 1998. EDOC '98. Proceedings. Second International La Jolla, CA, USA Nov. 3-5, 1998, New York, USA, IEEE, US, Nov. 3, 1998, pp. 306-318, XP010309740, ISBN: 0-7803-5158-4.

Chakravarthy et al., "ECA Rule Integration Into an OODBMS: Architecture and Implementation", Data Engineering, 1995. Proceedings of the Eleventh International Conference on Taipei, Taiwan Mar. 6-10, 1995, Los Alamitos, CA, USA, IEEE Comput. Soc. Mar. 6, 1995, pp. 341-348, XP010130158, ISBN: 0-8186-6910-1.

Sheth et al., "Federated Database Systems for Managing Distributed, Heterogeneous, and Autonomous Databases", ACM Computing Surveys 22(3), pp. 183-236, 1990.

Chawathe et al., "The TSIMMIS Project:Integration of Heterogeneous Information Sources", Proceedings of IPSJ Conference, pp. 7-18, Tokyo, Japan, Oct. 1994.

Tomasic et al., "Scaling Heterogeneous Databases and the Design of Disco", Proceedings of the International Conference on Distributed Computer Systems, 1996.

Carey et al., "Towards Heterogeneous Multimedia Information Systems: The Garlic Approach", Proceedings of the Fifth International Workshop on Research Issues in Data Engineering (RIDE): Distributed Object Management, 1995.

Ghosh et al., "An Infrastructure for Application Level Active Networking", Computer Networks 36 (2000), pp. 5-20.

Zhao, "The XSet XML Search Engine and XBench XML Query Benchmark", Technical Report UCB/CSD-00-1112, Computer Science Division, University of California, Berkeley, 2000.

Tennenhouse et al., "A Survey of Active Network Research", In IEEE Communications Magazine, Jan. 1997.

Obasanjo, "An Exploration of XML in Database Management Systems", http://ww25hoursaday.com/StoringAndQueryingXML.html.

Tennenhouse et al., "Towards an Active Network Architecture", Computer Communications Review, 26(2), 1996.

Marshall et al., "A Policy based Management Architecture for Large Scale Active Communication Systems", In Policies for Distributed Systems and Networks, LNCS 1995, ed. Sloman, Lobo and Lupu, Springer-Verlag 2001.

\* cited by examiner

USER INTERFACE TO A DATA STORAGE SYSTEM AND RULE STORE

This application is the US national phase of international application PCT/GB03/01973 filed 8 May 2003 which designated the U.S. and claims benefit of EP 02253228.7, dated 8 May 2002, the entire content of which is hereby incorporated by reference.

TECHNOLOGICAL FIELD

This invention relates to a method of operating a computer system to provide a user interface to a data storage system and to a computer system for providing a user interface to a data storage system.

BACKGROUND

A database management system (DBMS) controls the organisation, storage, retrieval, security and integrity of data in a database. Many organisations today use multiple, distributed, heterogeneous databases to support their processes (e.g. sales, marketing, purchases, employee databases) supplied by a variety of vendors (e.g. IBM, Oracle, Sybase). Each database may be using different data models including relational, object-relational and object oriented ones. Additionally, each database may provide different mechanisms (interfaces) for accessing the data. Furthermore, data of interest may be distributed among more than one database. Further complicating issues stemming from the use of multiple and heterogeneous databases (see Sheth et al., *Federated Database Systems for Managing Distributed, Heterogeneous, and Autonomous Databases, ACM Computing Surveys* 22(3), pp 183-236, 1990), render users unable easily to obtain and collate the information they require in a timely fashion.

The management of such multiple, distributed databases draws upon the area of database integration. In this field, there are two approaches to this integration. These are Mediators and Federated Database Management Systems (FDBMS).

Mediators are components that explicitly implement the integration of component databases. Their job is to store and retrieve data by translating the client requests and results between a high-level data model and the native data model of each data source. Example systems that use mediators are TSIMMIS (see S. Chawathe et al., *The TSIMMIS Project: Integration of Heterogeneous Information Sources, Proceedings of IPSJ Conference*, pp. 7-18, Tokyo, Japan, October 1994), DISCO (see A. Tomasic et al., *Scaling Heterogeneous Databases and the Design of Disco, Proceedings of the International Conference on Distributed Computer Systems*, 1996) and Garlic (see M. J. Carey et al., *Towards Heterogeneous Multimedia Information Systems: The Garlic Approach, Proceedings of the Fifth International Workshop on Research Issues in Data Engineering (RIDE): Distributed Object Management*, 1995).

In the FDBMS approach, data schemata of the component databases undergo several stages of transformation until a common integrated schema is produced. This is represented in a semantically rich data model, i.e. one that can describe all the specific features of the individual models adopted by each component source. This approach is applied by database vendors who, apart from their main commercial databases, develop so-called database gateways, i.e. solutions that provide transparent access to content stored in other vendors' databases. For instance, Sybase Inc. have developed the 'Adaptive Server®' that accesses data stored in Sybase as well as in DB2 (by IBM) and Oracle. Similar capabilities are offered by 'ORACLE 8i', the 'Informix Enterprise Gateway' and IBM's 'DB2 DataJoiner'. Additional examples may be companies that solely develop data integration solutions such as Cohera with their 'Content Integration System' and Data Integration Inc with 'InterViso'.

However, in these approaches there are two major deficiencies. First is the inflexibility to change. If a need for change occurs (including the addition of new databases/datastores to the system, the removal of existing ones or changes to the required behaviour of the system), the system must be statically reconfigured before the changes take effect. Such a reconfiguration process may involve the substitution of a new software part for an old software part, the change of configuration parameters of the system and the restart of the system. Second, there is a requirement in these approaches that the target database/datastore be identified in the request to store data or query data. Where mediators are used this requirement manifests itself as the need to select the particular mediator for handling the request, since each mediator only integrates/involves certain databases. Similarly in the FDMBS approach, the query or storage request should explicitly identify the databases that are to be targeted in the data handling process.

An interface that allows flexible management of data in a distributed environment of heterogeneous data storage systems is therefore required.

SUMMARY

According to a first aspect of the present invention there is provided a method of operating a computer system to provide a user interface to a data storage system, said computer system including a rule store storing one or more rules, said method comprising the steps:

providing a user interface to said rule store enabling user configuration of said rule store with one or more rules, each rule including information relating to a handler program, said handler program being associated with one or more user requirements and being operable to interact with said data storage system in accordance with said user requirements;

receiving a request detailing one or more user requirements;

responsive to receipt of said request:
  a) searching said rule store for a rule associating said one or more user requirements of said received request with a handler program;
  b) running said handler program to interact with said data storage system.

By providing a user interface to a rule store of a computer system, said user interface being operable to configure said rule store with one or more rules, each rule including information relating to a handler program, said handler program being associated with one or more user requirements and being operable to interact with a data storage system in accordance with said user requirements, and in response to receiving a request detailing one or more user requirements, searching the rule store for a rule associating said one or more user requirements of the received request with a handler program and running the handler, a customisable and extensible computer system operable to provide a user interface to a data storage system is provided. It should be noted that the term client can refer to a human user or a computer/workstation.

The computer system is customisable in that the user interface to the rule store enables a user to configure the rule store with rules that are interpretable by the computer system and which reflect the user's requirements. This customisability is in addition to being able to configure the rule store with rules that drive the internal behaviour of the computer system and aim at resolving system management issues such as data consistency and data integrity.

The computer system is extensible in that the functionality of the computer system can be easily extended—the user has to provide the computer system with sufficient information to find and execute a new handler program aimed at meeting the user's new requirements. This can be done by using the user interface to the rule store to configure the rule store with a new rule which includes the information relating to the new handler program.

In one embodiment the information relating to a handler program included in each rule comprises the name and the location of the handler program whilst in other embodiments the information relating to a handler program comprises the handler program itself. This embodiment is advantageous since the handler program can be deployed at the same time as the rule in which it is included.

In one embodiment said rule store user interface provision step comprises storing a rule associating predetermined user requirements with a handler program executable to interact with said rule store to introduce a further rule contained within said request into said rule store. In an alternative embodiment said further rule replaces an existing rule. In a further embodiment the request comprises a request to store a handler program. In another embodiment the rules are designated with a time after which the rules should no longer be applied. In an additional embodiment the request contains a rule associating a handler program with the user requirements of said received request.

In these ways, new handler programs and new rules can be pre-configured when the system is deployed, introduced at run time or a combination of both allowing customisability and dynamic adjustability to data management requirements. Handler programs need not be permanently loaded so those that are not being used make no demand on computing resources.

In other embodiments the data storage system comprises a plurality of databases possibly of a different format. The embodiments describe a flexible and scalable system where new data storage systems can be added while others can be removed according to requirements and availability simply by loading a relevant rule and/or handler program. The embodiments allow for the utilisation of the data storage system technology that gives the best performance for a particular data structure and usage pattern.

According to a second aspect of the present invention there is provided a computer system operable to provide a user interface to a data storage system, said computer system comprising:
 a data storage system;
 a rule store;
 a user interface to said rule store operable to enable a user to configure said rule store with one or more rules, wherein each rule includes information relating to a handler program, said handler program being associated with one or more user requirements and being operable to interact with said data storage system in accordance with said user requirements;
 request receiving means arranged in operation to receive a request detailing one or more user requirements;
 rule store searching means operable to search said rule store for a rule associating said one or more user requirements of said received request with a handler program;
 handler program running means operable to run said handler program to interact with said data storage system.

According to a third aspect of the present invention there is a digital data carrier carrying a program of instructions executable by processing apparatus to perform the method steps as set out in the first aspect of the present invention.

According to a fourth aspect of the present invention there is provided a method of operating a computer system to provide a user interface to a data storage system, said computer system including a rule store storing one or more rules, each rule associating a handler program with one or more request characteristics, said method comprising:
 providing a user interface to said rule store enabling the modification of said rules in said rule store;
 receiving a request having one or more request characteristics;
 responsive to the receipt of said request:
  a) finding a rule in said rule store associating a handler program with the one or more characteristics of said received request; and
  b) running said handler program to interact with said data storage system.

According to a fifth aspect of the present invention there is provided a computer system for providing a user interface to a data storage system said computer system comprising:
 a data storage system;
 storing means arranged in operation to store one or more rules, each rule associating a handler program with one or more request characteristics;
 means arranged in operation to provide a user interface to said rule store enabling the modification of said rules in said rule store;
 receiving means arranged in operation to receive a request having one or more request characteristics:
 finding means arranged in operation to find a rule in said rule store associating a handler program with the one or more characteristics of said received request; and
 running means arranged in operation to run said handler program to interact with said data storage system.

Embodiments of the present invention will now be described, by way of example only, with reference to the accompanying drawings, wherein like reference numbers refer to like parts, and in which:

DETAILED DESCRIPTION

In overview, a first embodiment of the present invention provides a system that allows flexible management of data in a distributed environment of heterogeneous data storage systems. Flexibility is provided via the use of dynamically-loaded software modules under the control of policies. These software modules, known as data handlers, are implemented as proxylets. A proxylet is a piece of Java™ code that can be dynamically invoked within an Execution Environment for Proxylets (EEP). The EEP is a Java™ virtual machine (JVM) and each proxylet runs on its own JVM. A further description of proxylets and EEPs can be found in Fry et al., *An Infrastructure for Application Level Active Networking, Computer Networks* 36 (2000) pp 5-20.

In the present embodiment, an organisation wishing to use multiple, heterogeneous data storage systems will create a policy document, referred to as a policy hereinafter. A policy allows a user within the organisation to specify the behaviour that they want the system to exhibit. Policies are written in accordance with a syntax represented by an Extensible Markup Language (XML) Schema. The syntax will now be described.

Figure 1:
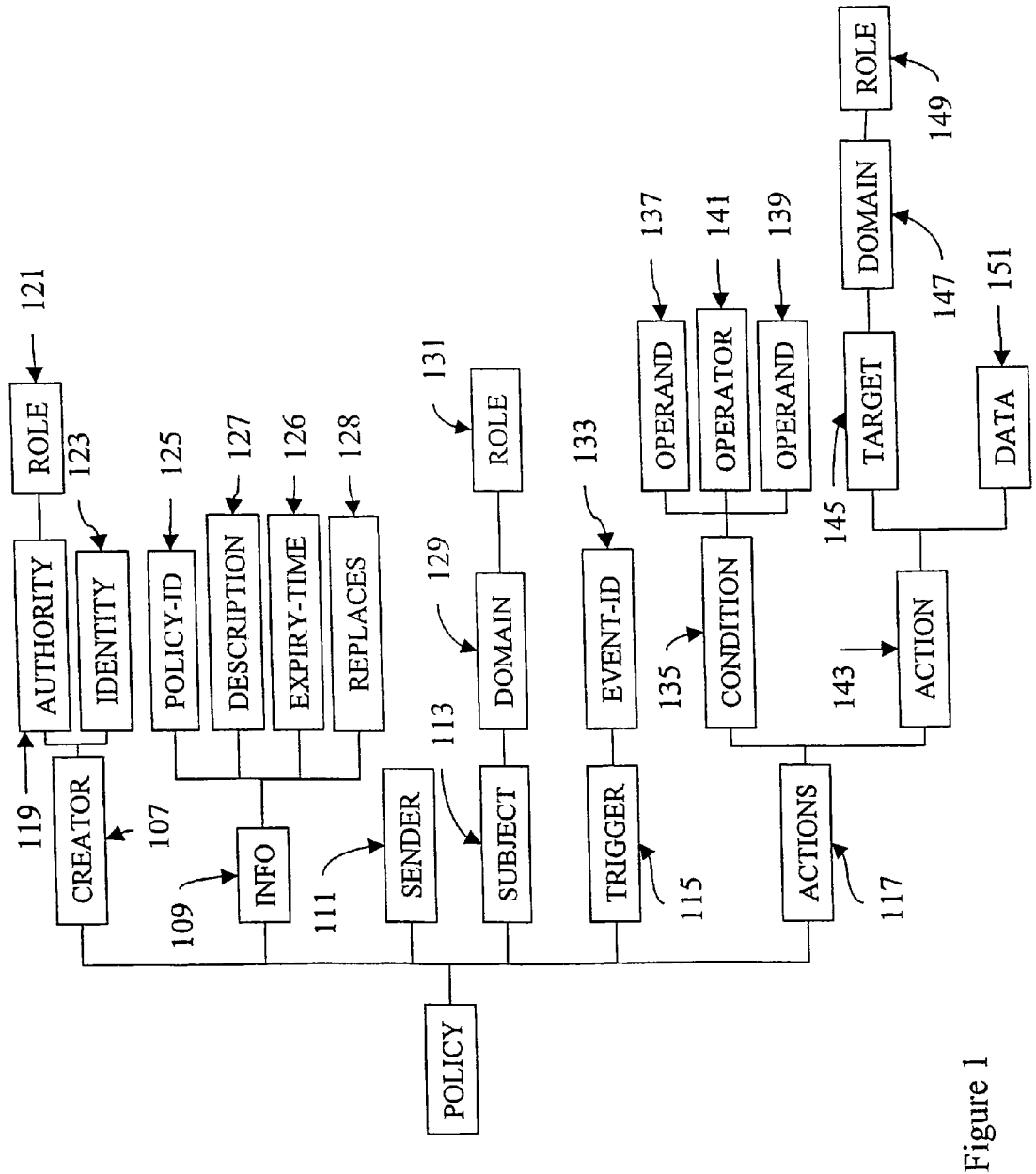
FIG. 1 illustrates the overall structure of a policy according to a first embodiment of the present invention.
Figure 3:
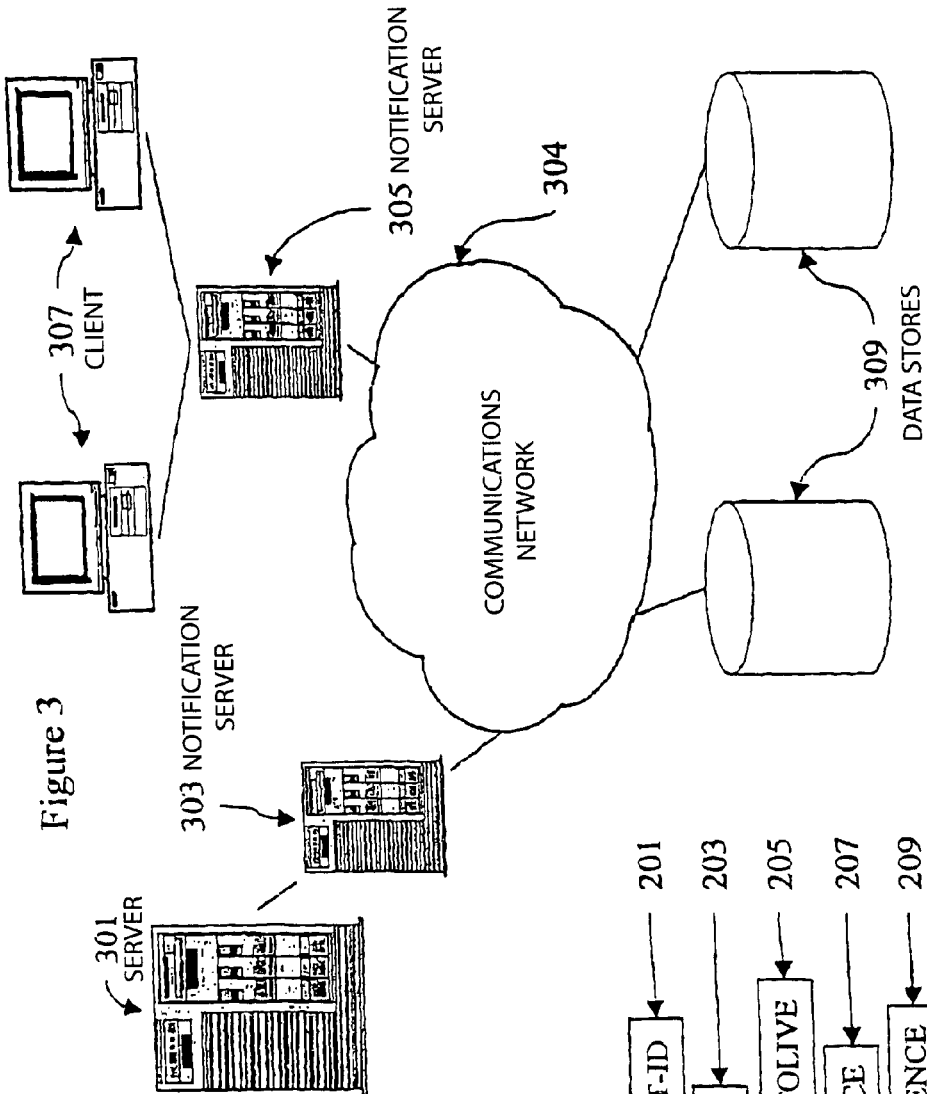
FIG. 3 illustrates the hardware used in a first embodiment of the present invention.

The overall structure of a policy is shown in FIG. 1. The top level policy specification consists of six elements. The creator 107, info 109, sender 111, subject 113, trigger 115 and actions 117 elements each contain additional elements and are described in detail below.

The sender 111 element contains (zero or more) strings identifying the forwarding path the policy has taken. The information contained in sender 111 could be used as a check that the policy has followed an expected route, or to establish that the policy has already been received by other parts of the system. This element may be modified between creation and receipt of the policy.

This policy specification is intended to be applicable in an environment where there are multiple points of control. Nodes should be able to accept control from users with different privileges. Since it is desired to achieve control by the use of policies, the Creator element 107 is provided in order to establish the origin of a policy.

The creator element 107 consists of an authority element 119 which itself consists of a role 121. (A role is simply a name for a group of related members and can be of any size [zero or more members]. An individual system entity can be in one or more roles at any time and role membership is not necessarily static.) The creator element 107 therefore allows the credentials of the policy author to be validated in a generic way, simplifying authorisation. It is also important in conflict resolution. Since control of particular system components may be shared, and policies may be set independently, conflicts cannot be prevented. Knowledge of the creators of a number of conflicting policies can allow priorities to be set.

The creator element 107 also includes an identity element 123 which specifies the individual responsible for the policy.

The info element 109 contains most of the information about the policy which is not directly related to the policy rules. It consists of two elements. The policy-id 125 is a string intended to be globally unique. The policy-id 125 is intended to be automatically processed and allows a policy to be unambiguously referenced. The description element 127 is an optional text string which is intended primarily for a human reader of the policy. It can be used to convey any additional information which is not intended for automated processing. The expiry-time 126 indicates when the policy should no longer be applied. The replaces element 128 contains a number (zero or more) of references to policies which are to be removed when the current policy comes into effect. These references match the policy-id elements in the policies to be replaced.

The subject element 113 identifies those entities in the system which are expected to execute the policy and invoke policy actions. Identification of these entities is done by role 131. This is important so that a policy can refer to entities which are not present or not known at the time of creation.

The subject element contains a domain element 129 (which is also used to identify targets for an action as described below). This allows set expressions to be used to identify the required group of entities.

The policy specification presented here is assumed to work with an event-based approach to distributing knowledge of system state. In this case a policy specifies the behaviour that a component should exhibit when a particular event occurs. The trigger element 115 in the policy relates an event to the policies that are supposed to handle it. When an event is detected, relevant policies must be activated. It is assumed that a policy is triggered by a single event. The trigger element 115 contains a single event-id element 133. This is a globally unique string, similar to the policy-id 125, which identifies the type of event that has occurred.

Every policy includes one or more actions elements 117. These specify the behaviour that should result from the triggering of the policy. Each actions element contains an optional condition element 135. This is an expression which evaluates as either true or false. If it is true, the associated action elements (of which there is at least one) are processed. If it is false, they are ignored. The condition takes the form of a simple logical expression where the operand elements 137, 139 identify parameters known to the entity evaluating the policy. These may, for example, be contained in the event triggering the policy. The operator element 141 allows comparison with other parameters or values and include equals, greater and less.

The action element 143, of which there is at least one in each actions element 117, specifies a target 145 set as a domain 147. This has already been discussed in connection with the subject element. Once again, target entities are identified by role 149. The data element 151 contains an element specifying the precise nature of the behaviour that should result from the triggering of the policy and references to a software module which will invoke this behaviour. In alternative embodiments, the data element 151 could contain the executable code of the software module which will invoke this behaviour.

As mentioned above, the policy specification presented here is assumed to work with an event-based approach to distributing knowledge of system state. An event is a means used to trigger some form of behaviour as a reaction to a phenomenon or system state change that has occurred. Event documents (referred to as events hereinafter) can be generated by users or they can be automatically generated by an entity in the system. Events are generated in accordance with a syntax represented by an XML Schema. The syntax of events will now be described.

Figure 2:
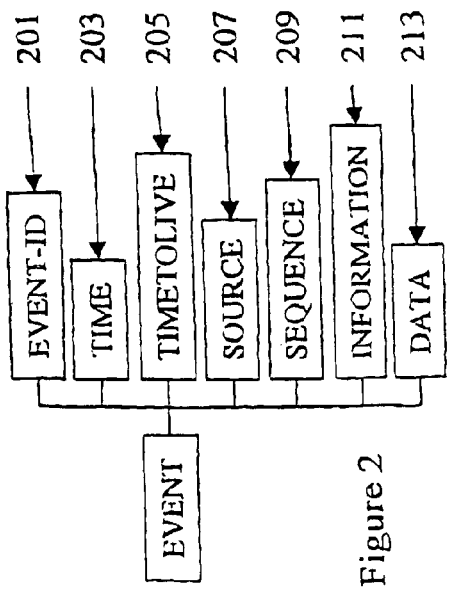
FIG. 2 illustrates the overall structure of an event according to a first embodiment of the present invention.

The overall structure of an event is shown in FIG. 2.

The top level event specification consists of seven elements. Each event type has a unique event-id 201, a globally unique string which is used to trigger appropriate policies. The time element 203 identifies when the specific event occurred while the optional timetolive element 205 specifies for how long the event is relevant. Use of this information can allow certain events to be discarded if not handled in time, limiting unnecessary management traffic. The source element 207 identifies where the event originated. The sequence element 209 is an integer which is incremented with each event produced from a particular source. This can support ordering of events. The optional information element 211 is a string intended to be read by people rather than processed automatically. The data element 213 has an open content model and allows any well-formed XML to be included. This is where any specific information relevant to the event can be included.

The policy-based data management system of the present embodiment is now described in more detail.

The first embodiment of the present invention is implemented in a system called Directory Service (DS). The DS itself consists of modules that have been written in the Java™ programming language. The modules are loaded onto a server 301 which is connected to a data communications network 304 (such as an IP network) via a first notification server 303. Clients 307 are also connected to the communications network 304 via a second notification server 305. The notification servers handle all communications between clients 307 and the DS. Clients 307 needing to send an event or policy to the DS use the second notification server 305 as an entry point to the system. In the present embodiment, Java™ remote method invocation (RMI) is used for this interface. (For details of RMI see Merlin Hughes et al., *Java Network Programming, Manning Publications*, 1997, p 501.) Also connected to the communications network are data stores 309. These data stores could be, for example, file databases, relational databases or object-oriented databases and could be provided by, for example, IBM, Oracle or Sybase.

Interaction between the clients 307 and the DS 400 occurs through the consumption and production of event documents. An event is considered consumed when it is generated at a source and received at the DS 400 and produced when it is generated at the DS 400 and received at a different destination.

The DS 400 accepts event-based interactions from clients belonging to DS-specific roles, namely DSUser, DSConfigurator and DSAdministrator.

Clients which simply use the store and retrieve functionalities of the DS 400 are known as DSUsers. A DSUser may send to the DS 400 any of the following events: StoreData (in order to store data in one of the data stores 309), StoreEvent (in order to store (i.e. log) an event in one of the data stores 309), StoreProxylet (in order to store proxylet meta-data) and Query (in order to query some data in one of the data stores 309). The DSUser would include the event name in the event-id element 201 of the event and either (i) the data or proxylet to store, (ii) the event to log or (iii) the query expression, in the data element 213 of the event.

The DS 400 supports default data handling mechanisms for handling requests in case no special requirement is imposed by DSUsers. However, there may be DSUsers requiring that the DS 400 uses customised data handlers, i.e. data handlers other than the default ones. For this to happen the DS 400 needs have been properly configured prior to a request arriving. Configuration can be carried out by a DSConfigurator.

Clients with all the privileges of DSUsers and also the privilege of setting the DS 400 up with configuration policies are known as DSConfigurators. A configuration policy (DSPolicy) is a policy that determine the software module that should be used for managing incoming content. The name of the DSPolicy is contained in the policy-id element 125 of the DSPolicy. The name of the event that triggers the DSPolicy is contained in the event-id element 133 of the policy and should match the event-id element 201 of the triggering event. Examples of DSPolicies are StoreData, StoreEvent, StoreProxylet and Query.

A DSConfigurator interacts with the DS 400 by sending StoreDSPolicy events (in order to store a DSPolicy) and QueryDSPolicy events (in order to query a DSPolicy) to the DS 400. The DSConfigurator would include the event name in the event-id element 201 of the event and the DSPolicy to store or query expression in the data element 213 of the event.

Clients with all the privileges of DSConfigurators and also the privilege of creating administrative policies are known as DSAdministrators. Administrative policies determine what software module should be used for managing incoming DSPolicies.

A further role is that of the DirectoryService. This role directly represents the DS 400. It is only used to identify the DS as the subject and target of actions of DSPolicies and the source of QueryResults events (produced by the DS in order to return the results of a query; returned in the data element 213 of the event) and Acknowledgement events (produced by the DS in order to confirm the success of an operation. A message confirming the success is included in the data element 213 of the event).

Figure 4:
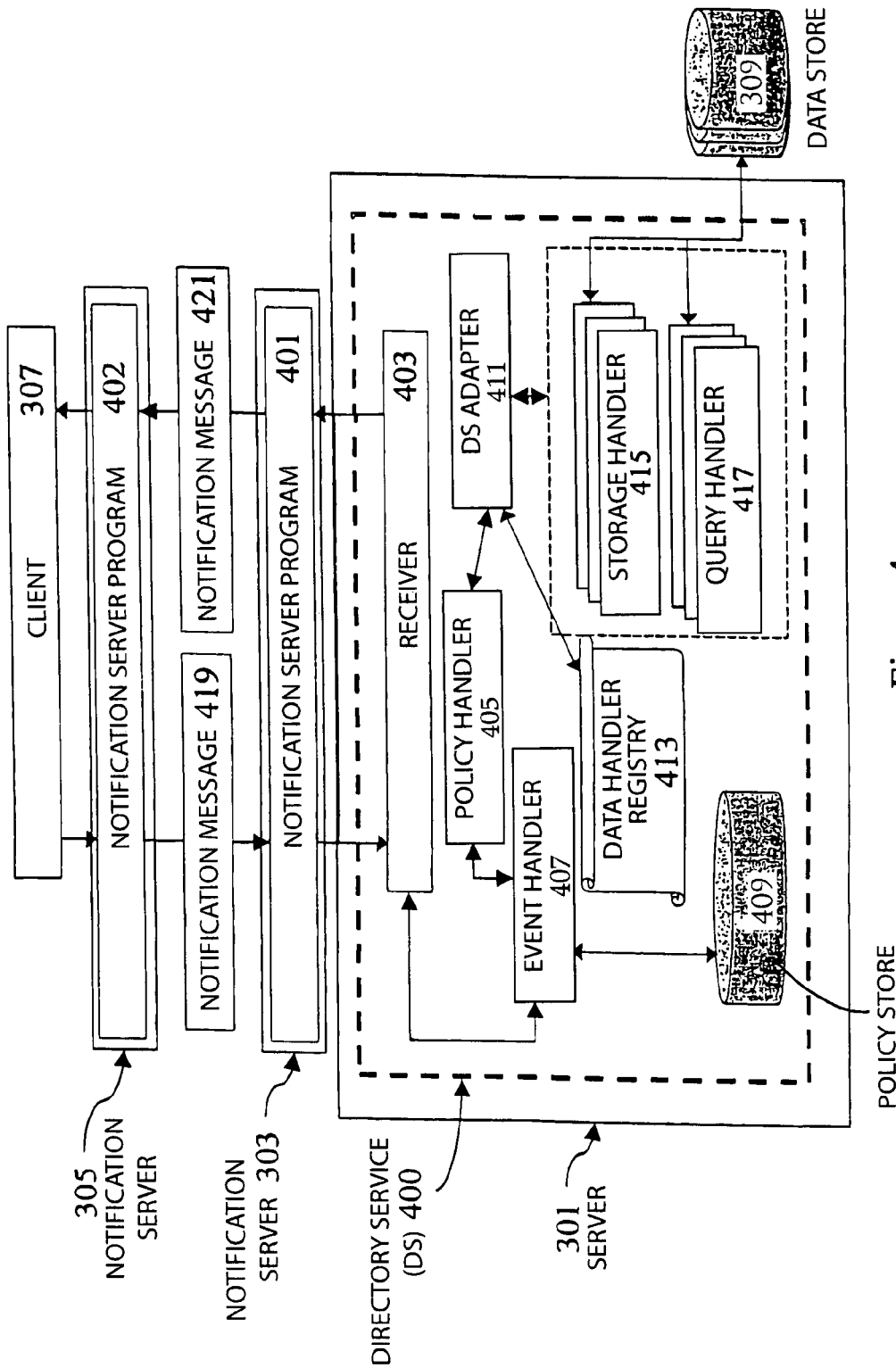
FIG. 4 illustrates the architecture of the software used in the first embodiment to provide a Directory Service (DS)

Referring now to FIG. 4, the DS 400 consists of the following modules: a Receiver 403, Policy Handler 405, Event Handler 407, Policy Store 409, DS Adapter 411, Data Handlers Registry 413 and two data handlers—a Storage Handler 415 and a Query Handler 417. As mentioned above all the modules have been written in the Java™ programming language.

Receiver 403

This is the principal class that initiates the DS 400 with the main method. When the Receiver 403 is run, it firstly initialises the DS 400. Then, a reference to a Receiver object is published to a remote method invocation (RMI) registry so that the notification server 303 can contact the DS. The Receiver 403 consumes events sent to the DS 400 by clients 307 and responds by producing Acknowledgement events and QueryResults events. Upon consumption of an event a Transaction Context object is created and the Event Handler 407 is contacted. When producing an event, the Receiver 403 uses the getEventSourceURI( ) method (see below) of the transaction context object in order to retrieve the destination to which the event is to be sent.

Transaction Context

This class aims at recording information relevant to every new transaction that starts as soon as an event is consumed. The transaction-related information captured in the transaction context object is the event source's name and location. It will be remembered that this information is contained in the source element 207 of the event. The transaction context object provides getter [getEvenSourceEntity( ) and getEventSourceURI( )] and setter methods [setEvenSourceEntity( ) and setEventSourceURI( )] for this data. The transaction context object is created at the Receiver 403, it is updated by the Event Handler 407 and it is consulted by the Receiver 403 and Policy Handler 405. It is an object exchanged between Receiver 403, Event Handler 407 and Policy Handler 405 in order to provide to all a common view of useful transaction-related information.

Event Handler 407

This class is responsible for handling all consumed DS events. It contains the handleEvent( ) method and getDSPolicy( ) method. The event XML document and a transaction context object are passed to the handleEvent( ) method by the Receiver 403. The handleEvent( ) method firstly parses the event XML document to generate a document object model (DOM) tree and then unwraps the data part from the rest of the event DOM, where data represents the content to process i.e. the information to store or query to run. It will be remembered that the data is contained in the data element 213 of the event. Additional processing involves updating the transaction context object with event source name and location. It will be remembered that this information is contained in the source element 207 of the event. The getDSPolicy( ) method retrieves from the Policy Store 409 the relevant policy based on the event-id found in the event-id element 201 of the event and the event-id element 133 of the policy. In case no policies are found, the DS Adapter 411 is directly contacted for handling of the data using the default data handlers. If the consumed event involves storing a DSPolicy, then the getDSPolicy( ) method retrieves an administrative policy. All retrieved policies are parsed before being passed onto the Policy Handler 405.

Policy Handler 405

This class handles the retrieved DSPolicies. It contains the following methods: handlePolicy( ), validatePolicy( ), analysePolicy( ) and executeAction( ). The Event Handler 407 passes the retrieved policy to the handlePolicy( ) method. The Policy Handler uses the validatePolicy( ) method to check the validity of the policy. The following rules must be satisfied by the policy elements:

i. The value of the role element 121 needs to indicate a role with the privilege of performing the specified actions.
ii. The value of the identity element 123 needs to match the value of the source element 207 of the event. This association assumes that the policy creator is the same entity as the event source.
iii. The value in the policy-id element 205 should contain the policy name which matches the name of the triggering event.
iv. The value in the role element 131 should mention the DirectoryService role because this is the subject that executes the policy and invokes policy actions.
v. The value in the event-id element 133 should match the event-id element 201 of the corresponding event that triggers the policy.
vi. The value in the operand element 137 should be set to EventSource by default.
vii. The value in the operator element 141 should be set to equals by default.
viii. The value in the operand element 139 should be set to the same value as the identity element 123 and the source element 207 of the event This and rules (vi) and (vii) above impose a condition which indicates that in order to trigger the policy, apart from checking the event type, it is also necessary to check if this event is originating from a trusted source. This is important as consumed events with the same event-id, such as StoreProxylet, may be generated by more than one source but the specific policy should only be triggered when this one event comes from one specific source.

ix. The value in the role element 149 should specify the DirectoryService role as this is the target on which to invoke the particular policy action. Specifically, the target on which to invoke the action is the DS Adapter but this is an internal DS mechanism and not a role.
x. The value in the data element 151 should include the name of the proxylet class, the location of the jar file containing the proxylet code (a jar (Java™ Archive) file is a compressed archive that contains the proxylet code as well as any other relevant code associated with the proxylet, i.e. any other class the proxylet needs to have in each class path in order to run with no errors) and one of two 'method' values, namely, store or query for store or query events respectively.

Next, the analysePolicy( ) method interprets the policy to recover details about which data handler proxylet to use. These details (the name of the proxylet class and the location of the jar file containing the proxylet code) are the values contained in the data element 151. The recovered details and the data found in the data element 213 of the event are used by the executeAction( ) method which then communicates with the DS Adapter 411. In case the chosen policy is an administrative one, analysePolicy( ) will target the content, represented by the data found in the data element 213 of the event, to the Policy Store 409.

Policy Store 409

This is an internal database that stores configuration and administrative policies. The present embodiment uses XSet, an in-memory and XML-based database. In-memory databases are a special type of database in which all data is stored in memory instead of in files on a hard disk in order to provide faster access to the data. Details of XSet can be found in *The XSet XML Search Engine and XBench XML Query Benchmark*, Technical Report UCB/CSD-00-1112, Ben Yanbin Zhao, Computer Science Division, University of California, Berkeley, 2000. The Policy Store 209 provides access methods to its content. Specifically, storeInXSet( ) stores XML documents either in the form of DOM trees or read in from files and queryXSet( ) retrieves XML documents by executing a query expression.

DS Adapter 411

This class is responsible for loading and managing data handlers and for the invocation of policy actions. The Policy Handler 405 passes to the invokeAction( ) method of the DS Adapter 411 class the name of the proxylet class, the location of the jar file containing the proxylet code and the name of the action to invoke. These three values are all contained in the data element 151 of the policy. Then the DS Adapter 411 checks the Data Handlers Registry 413 for the handler's availability and in case of failure the loadHandler( ) method of the DS Adapter class is used to initiate the handler's proxylet passing to the registry the proxylet's name and location. The proxylet starts running in the EEP and a reference to the handler is recorded in the registry using the register Handler( ) method of the DS Adapter class. The invokeAction( ) method is also used by the Event Handler 407 in case no policies are retrieved and the default data handlers need be used. The Receiver 403 also uses the invokeAction( ) method during initialisation in order to start the default data handlers.

Data Handlers Registry 413

This is a local table that keeps references to the already initiated data handlers, which are registered to it by inserting the data handler proxylet's name into the table. Access methods are provided namely, put( ) for store, get( ) for retrieval, remove( ) for delete and containsHandler( ) for checking the inclusion of a data handler reference. Each member of the registry implements the following Java interface, which is just a marker i.e. it only marks each member as a Data Handler.

public interface DataHandler { }

The only module that contacts the Data Handlers Registry 413 is the DS Adapter 411.

Data Handler Proxylets

The role of the Data Handler Proxylet is to control the lifetime of a data handler. More specifically, it can initialise, run, control and stop a Data Handler through the respective methods of the proxylet interface.

In the init( ) method, the address for an rmi registry is received and stored locally. This address is important information for the proxylet, as this is where it will publish the data handler reference. The address is written as an external argument next to the name of the proxylet in the Launcher.run( ) method called in the DS Adapter 411.

In the run( ) method the aim is to create a data handler object and publish it to the specified rmi registry address. The name used to publish the handler is the name of the current proxylet. The main reason for this is the intention to control the handler entirely through the proxylet, hence every access to the rmi registry in search of the handler retrieves its associated proxylet's name. In order that the EEP does not automatically call the stop( ) method killing the proxylet, the run( ) method enters an indefinite while (true) loop so that control of killing the proxylet and hence the handler is obtained from outside, specifically from the Launcher.stop( ) method. In order to minimise the resource consumption by the proxylet while it remains alive, the while(true) loop contains a Thread.currentThread( ).sleep(10000) statement that puts the current thread to sleep for 10 secs.

Finally the stop( ) method includes code that removes the data handler reference from the rmi registry. This completes the proxylet's control of the lifetime of the handler.

File Storage Handler 215

This module stores XML documents in files. In the present embodiment there is only one file created to keep all the received data. In alternative embodiments it is possible to create one file per role to achieve separation of content. The handler implements the following StorageHandler interface public interface StorageHandler extends DataHandler, Remote{ public void store (String xmlString) throws RemoteException;}

The store( ) method receives a string that represents the XML document to save. Every storage handler needs to implement this interface. StorageHandler also extends Remote. This means that contact with the handler is achieved through RMI. The respective handler proxylet takes care of publishing a handler object to some rmi registry. The real handler object is contacted directly by the DS Adapter 411.

File Query Handler 417

This module implements the querying functionality to retrieve XML documents from files. The targeted file is the same as that used by the FileStorageHandler to store XML documents. The handler implements the following QueryHandler interface public interface QueryHandler extends DataHandler, Remote{
   //Vector contains Strings each representing one XML document that is a query hit.
   public Vector query(String xmlString) throws RemoteException;

}//End interface

The query( ) method receives a string that represents the query expression. Query( ) executes the expression and returns a vector containing the results in the form of strings, i.e. each string corresponds to a XML document. Generally, every query handler needs to implement this interface. QueryHandler also extends Remote. This means that contact with the handler is achieved through RMI. The respective handler proxylet takes care of publishing a handler object to some rmi registry. The real handler object is contacted directly by the DS Adapter 411.

When a DS instance is started, the DS 400 initially registers with a notification server program 401, which has been loaded onto the notification server 303, to announce its interest in listening for certain types of event specific to the DS 400. Each time a client 307 has to send to the DS 400 either a query or data for storage, it issues an event with the query expression or data for storage contained in the data element 213. The event firstly reaches a notification server program 402, which has been loaded onto the notification server 305 and which the client 307 is registered with. Upon reception of the event, the notification server program 402 wraps the event up in a notification message 419 (i.e. the event is enclosed within the notification message 419) and delivers the message to the notification server program 401 that the DS 400 is registered with. The notification server program 401 unwraps the event part from the message (i.e. extracts it) and sends it to the Receiver 403.

Figure 5:
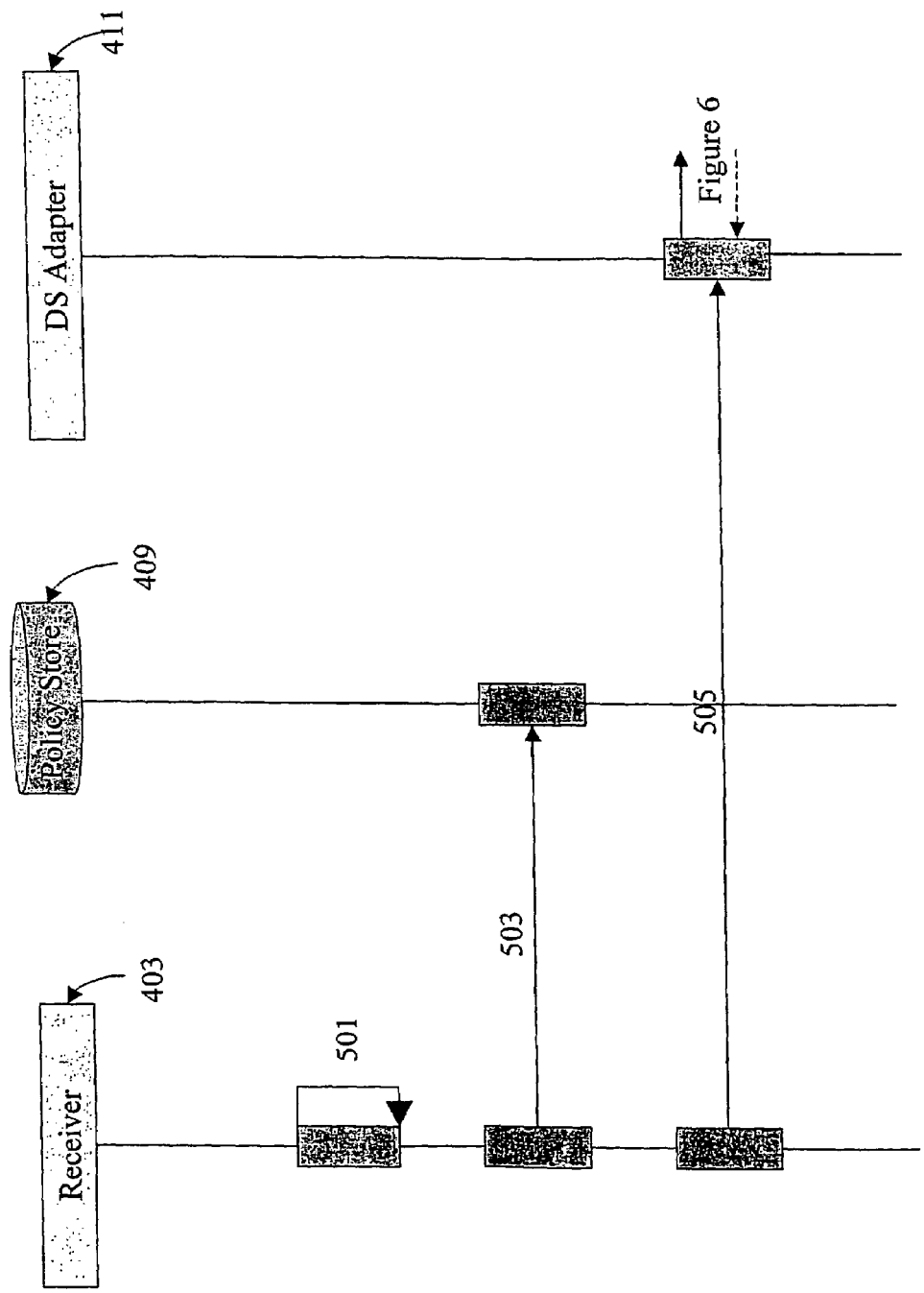
FIG. 5 illustrates the initialisation of the DS.

Referring to FIG. 5, initially the Receiver 403 consumes two events (501). These events are sent by a client 307 acting in the role of a DSAdministrator. The events contain in their data elements 213 two administrative policies. The event-id elements 133 of both policies do not contain any values, indicating that the policy is to be activated as soon as it is received. The first policy determines that upon consumption of a StoreDSPolicy event, sent by a DSConfigurator role, the data contained in the data element 213 of that StoreDSPolicy event should be stored in the Policy Store 409. The second policy indicates that when a QueryDSPolicy event is consumed, the query contained in the data element 213 of that QueryDSPolicy event should be run on the contents of the Policy Store 409. Both administrative policies are stored (503) in the Policy Store 209.

Then the Receiver initiates (505) two default data handlers, one for storing and one for querying. The default handlers are used any time StoreEvent, StoreProxylet and Query events arrive from a DSUser and no DSPolicy is found in the Policy Store 409 to indicate how to handle these events. The default handlers are an instance of a FileStorageHandler and a FileQueryHandler which both manipulate content in files. The handler loading process is thoroughly described below.

Figure 6:
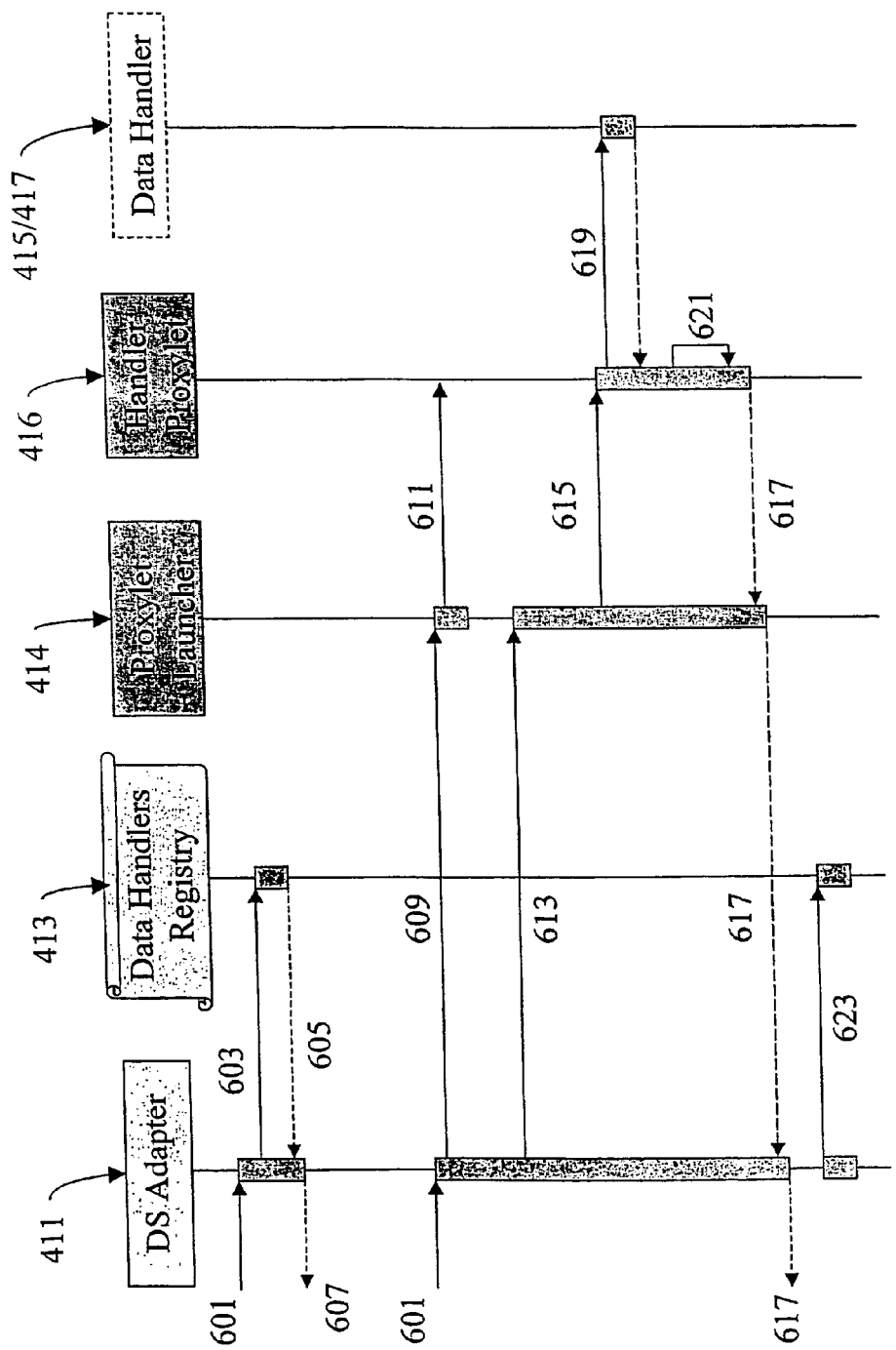
FIG. 6 illustrates the loading of data handlers.

The loading and running of data handlers by the Directory Service will now be described with reference to FIG. 6.

The main module that handles the process is the DS Adapter 411. Each request (601) arriving at it carries information about what proxylet to load. This information consists of the name of the proxylet to load and of the URL for the location of the jar file containing the proxylet code. The DS Adapter 411 uses the name of the proxylet firstly to check (603) in the Data Handlers Registry whether the proxylet is already loaded and running. If the data handler proxylet is running then it is returned (605/607) as an object to the requesting entity. If the proxylet is not yet running then the DS Adapter 411 uses a Proxylet Launcher object 414 to start it. The Proxylet Launcher object 414 is a singleton, i.e. it is instantiated once within the DS Adapter 411 and is active all the time the DS Adapter 411 object is alive. Upon instantiation of the Proxylet Launcher 414, information is passed to it about what host runs the EEP which executes the data handler proxylets. Then the Proxylet Launcher is instructed by the DS Adapter (609) to load (611) the proxylet jar file from the indicated location. Finally the Proxylet Launcher 414 is instructed (613) to run (615) the proxylet with the particular name. The proxylet is then returned as an object (617) to the requesting entity. During execution of the run( ) method of the proxylet, an instance is created (619) of the data handler controlled by the proxylet and it is published (621) to an rmi registry so that the data handler instance can be remotely contacted. The location of the host running the rmi registry is passed along with the name of the proxylet within the String argument of the Launcher's run( ) method. To keep the proxylet alive as long as the handler object is alive, the proxylet's run( ) method enters an indefinite loop. Otherwise the proxylet would stop and control over the Data Handler object would have been lost. The final remaining step for the DS Adapter is to update (623) the Data Handlers Registry 413 with the new Data Handler object, using the name of the handler controlling proxylet as an identifier of the handler within the registry.

Figure 7A:
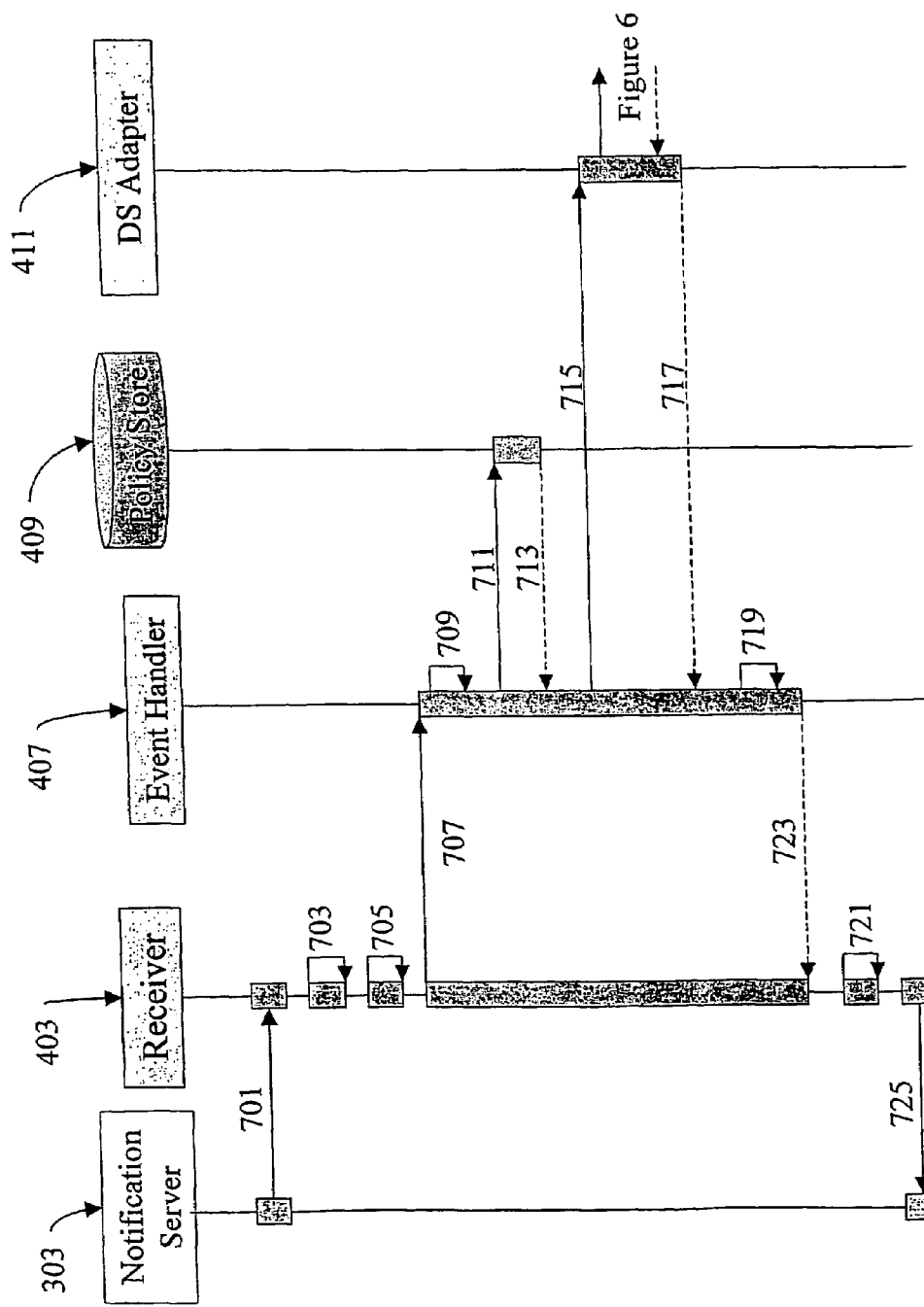
FIG. 7*a* illustrates the handling of DSUser events with default data handlers.

The handling of DSUser events using the default data handlers will now be described with reference to FIG. 7*a*.

The Receiver 403 consumes (701) StoreProxylet, StoreEvent and Query events arriving at it from a client through notification servers 303/305. The event is parsed (703) using the Xerces Java™ Parser (from The Apache XML Project) and a Transaction Context object is created (705). Both event and transaction context object are passed (707) through to the Event Handler 407, which initially unwraps (709) the data from the event. The data represents either the content to store in or a query to execute and is contained in the data element 213 of the event. Additionally, the Event Handler 407 updates the Transaction Context object with the event-id and the event originator's URL, information indicated by the value of the source element 207 of the event. Next, the Policy Store 409 is contacted (711) to retrieve any policies relevant to the received event. Important information for this search is the event-id contained in the event-id element 201 of the event. In this current case the assumption is that no such policies have been set by a DSConfigurator role prior to the event's occurrence, hence the search yields no policies (713). Therefore, the Event Handler 407 assigns the Default Data Handlers to handling the received data, so it interacts (715) with the DS Adapter 411 to obtain the active instance of either the default Storage Handler or the default Query Handler. Since the default handlers are initiated at the moment of the Directory Service initiation (see above), they are already registered in the Data Handlers Registry 413; hence the DS Adapter 411 immediately retrieves and returns the appropriate handler reference (717). The Event Handler 407 consults a list of events consumed by the DS 400 and decides what action to invoke on the retrieved data handler, based on the received event-id. Next, the action is invoked (719) on the data handler. In case of a query, the Receiver 403 produces a QueryResults event (721) that contains the results returned (723) to it from the Event Handler 407. In case of a storing action, an Acknowledgement event is produced (719). Either produced event is finally returned (725) to the requesting client through the notification servers 303/305 (i.e., the event is enclosed within the notification message 421). The event's destination is obtained from the Transaction Context object.

Figure 7B:
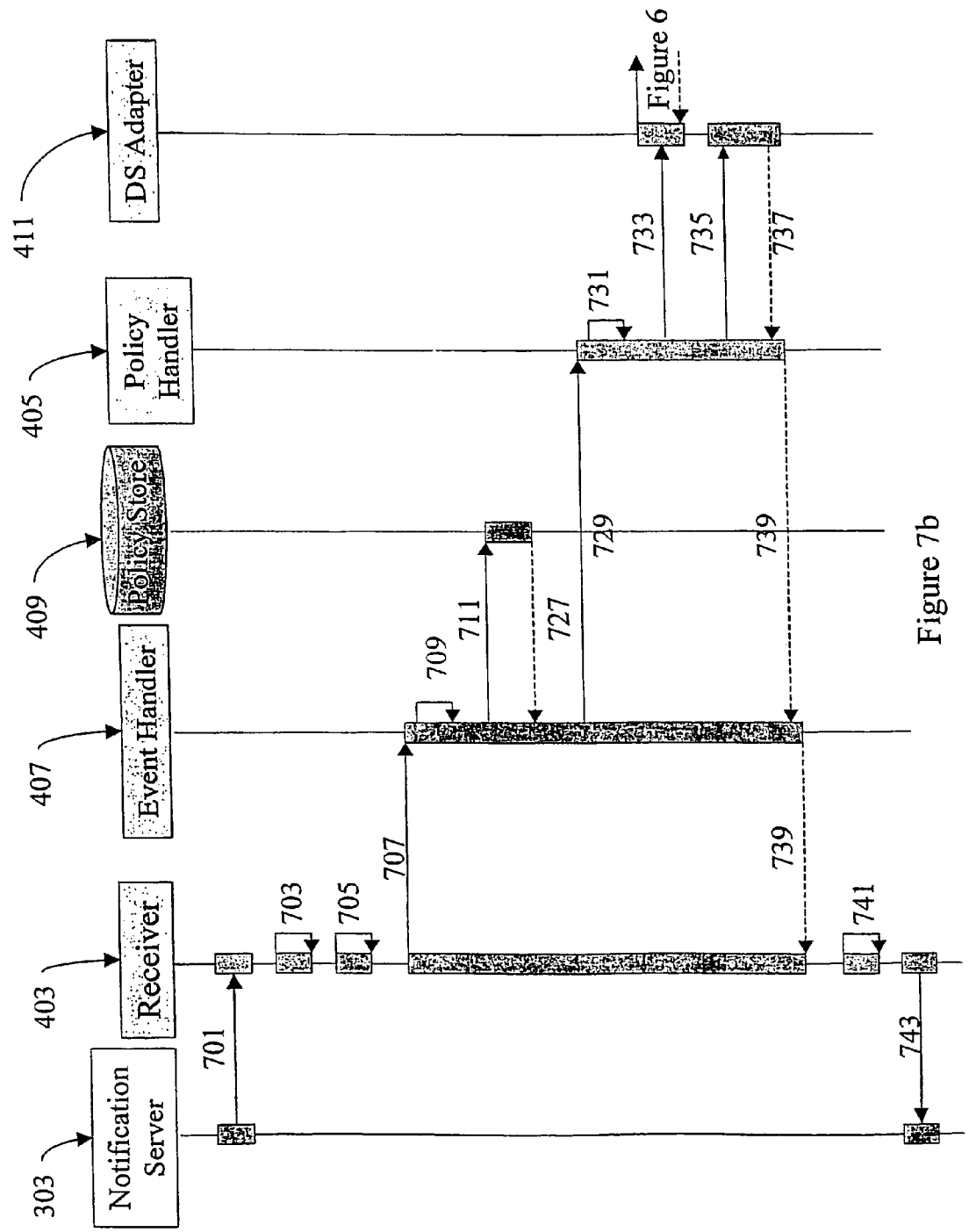
FIG. 7*b* illustrates the handling of DSUser events with special data handlers.

The handling of DSUser events with data handlers that are dynamically initiated upon the consultation of a DSPolicy will now be described with reference to FIG. 7*b*.

This case follows the same sequence of operations (701-711) as above until the point where the Event Handler 407 contacts the Policy Store 409. This time the search yields a DSPolicy (727), which is passed (729) to the Policy Handler 409 along with the data contained in the data element 213 of the event and the Transaction Context object. The validation process (731) concentrates upon checking the values of certain elements in the policy document. A valid policy is one that is created by a DSAdministrator or a DSConfigurator role. In the latter case specifically, it is additionally required that the entity which created the policy is the same as the entity that sends the DSUser event. Practically, this requires the value of the source element 207 of the event to be equal to the value of the identity element 123 of the policy. The next step is to analyse (731), i.e. interpret, the policy. The aim of the analysis is to extract the information that describes the Data Handler which should be used. The specific information is the name of the data handler proxylet class, the location of the proxylet's jar file and the name of the method to invoke on the handler. This information is contained in the data element 151 of the policy. Subsequently, the proxylet name and jar file location are passed (733) onto the DS Adapter 411 module with the request to run the specified handler. The process followed here is the same as that described above. When the Data Handler is run, the Policy Handler 405 requests (735) that the DS Adapter 411 invokes the action specified in the selected DSPolicy, passing also the data (from data element 213) to be handled. The DS Adapter 411 invokes the requested action and returns (737) either query results or a success/failure indication of the storing operation. This return is propagated (739) all the way back to the Receiver 403 which respectively produces (741) a QueryResults or Acknowledgement event to send back (743) to the initial event source through the notification servers 303/305.

Figure 8:
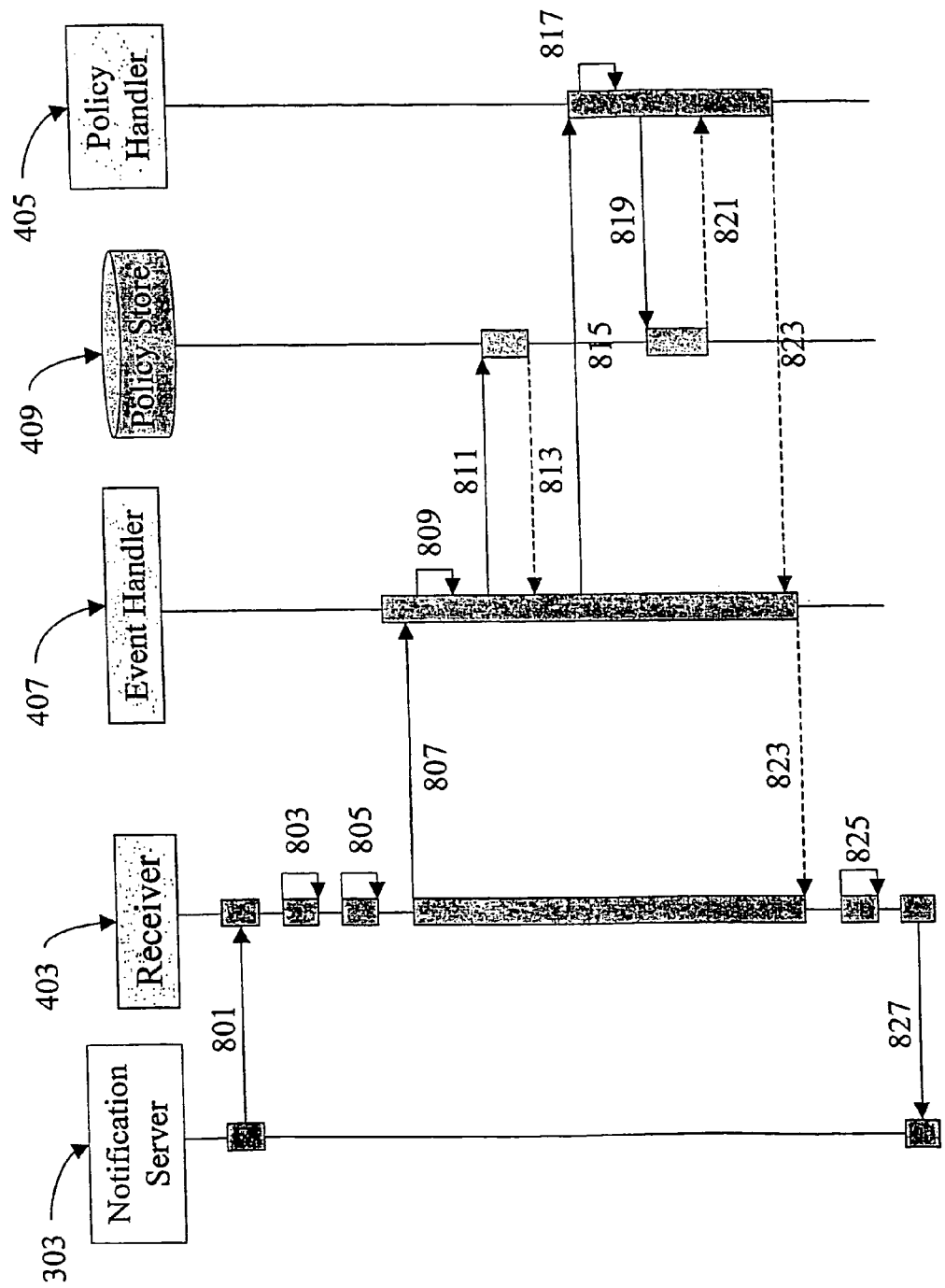
FIG. 8 illustrates the handling of DSConfigurator events.

The handling of DSConfigurator events (e.g. StoreDSPolicy and QueryDSPolicy events) will now be described with reference to FIG. 8.

In the beginning the event is consumed (801) by the Receiver 403. Then it gets parsed (803) and a Transaction Context object is created (805). Both parsed event and transaction context object are sent (807) to the Event Handler 407 which unwraps (809) the data, contained in the data element 213, from the event and updates the transaction context object with the event source URI from the source element 207 of the event. Next, the Policy Store 409 is checked (811) for administrative policies. These policies are created by the DSAdministrator role and are the ones that the DS read in from files as described above. These policies determine that the Policy Store 409 is the data store to target when handling the content of DSConfigurator events. The retrieved administrative policy is returned (813) to the Event Handler 407 and then passed (815) along with the data to the Policy Handler 405. There, the policy is validated and analysed (817) after which the Policy Handler 405 invokes (819) the action specified in the policy to either store or retrieve content from the Policy Store 409. The Policy Store 409 then returns (821) either query results or a success/failure indication of the operation. The results are propagated back (823) to the Receiver 403 which produces (825) an Acknowledgement or QueryResults event. Either produced event is finally returned (827) to the initial event source through the notification servers 303/305.

An extension to the above described embodiment allows a client to set policies with a scope of one transaction that the client may hold with the DS 400. In this case the policy would describe a specific data handling requirement for the current client request. This type of policy is called a data handling policy. For example, a user runs a query from a personal digital assistant (PDA) and wants the presentation of the query results to be adjusted to a customary format compliant with the PDA. For this purpose the client may send along with the query a policy that captures this particular requirement, i.e. the fact that the results are expected in a presentation format compliant with his PDA. A corresponding configuration policy may already exist in the DS 400, prior to the initiation of the query transaction by the client and may contain information about a format-adjusting proxylet. This proxylet should contain code that implements the necessary format transformation taking account of all special features specifically characterising the client's PDA. In this sense the configuration policy, which represents all knowledge about the transformation into the PDA-compliant format, may be continuously resident in the Policy Store 409 for longer than the query transaction's lifetime, even longer than the time the user is active on the PDA, and it may be executed in many other transactions between the client and the DS 400. On the other hand, the data handling policy is active within the boundaries of only one transaction. In the example, when the query results are retrieved at the DS 400, the Policy Handler 405 handles the data handling policy. The above explained DSPolicy then has to be retrieved from the Policy Store 409. It includes details of the proxylet to run in order to achieve the format transformation. It is important that the data handling policy follows the same rules as a DSPolicy so that it can be validated by the Policy Handler 405.

Although in the above described embodiment the clients 307 communicated with the DS 400 via notification servers 303/305, in other embodiments a direct client/server link across the communications network 304 is possible.

Although in the above described embodiment an in-memory based database (XSet) was used as the Policy Store 409, in other embodiments any persistent data store such as those available from IBM, Oracle and Sybase would be suitable. Furthermore the Policy Store 409 could be remote from the DS 400, e.g. linked via the communications network 304.

Although in the above described embodiment the data handlers were described to be part of the DS 400, in other embodiments they could be remote from the DS 400, e.g. linked via the communications network 304.

Although in the above described embodiment the DS is implemented to host only store and query policies and respond only to store and query events, other types of policy and event are possible. For example, update events would occur when a DSUser needs to update already stored proxylet meta-data and delete events would occur when a DSUser needs to delete a proxylet or a policy.

The main benefit of the DS stems from the fact that it is configurable from the client's viewpoint with policies that are interpretable by the DS and which reflect the client's requirements. This configurability is in addition to configuring the DS with administrative policies that drive its internal behaviour. The example given below of an application of the DS is indicative and not exhaustive:

An organisation's Intellectual Property Department (IPD) wants to create a list of all the inventions that have arisen out of each of the organisation's laboratories in the last 10 years. This would require access to IPD's own internal records database (in order to find the inventors' names and the case file number) and also to the organisation's personnel database (to find the inventor's Organisation Unit Code (OUC), i.e. which laboratory that inventor works in). IPD would have to run its own database's client program to get the inventors' names and case file numbers and a web browser program to get the corresponding OUCs.

To integrate the two databases, IPD could implement a Mediator based approach, an FDBMS based approach or it could achieve the integration by providing a policy and appropriate data handlers for the DS. In other words, the functionality of a mediator or an FDBMS may be provided by a policy and a set of data handlers. A description of what the relevant policy and the data handlers would do to provide this functionality is given below.

Event

A message from IPD arrives at the DS requesting a list of all the inventions that have arisen out of each of laboratory in the last 10 years. The DS searches in the policy store for relevant policies. The search yields a policy1 below.

POLICY1

Action1: Activate and run a proxylet that returns all inventor names and case file numbers for the past 10 years in a structure containing the fields "Name of Employee" and "Case File Number". This proxylet runs a query against the IPD internal records database.

Action2: Activate and run a proxylet that returns all the OUCs for the names retrieved by Action1 in a structure containing the fields "Name of Employee" and "OUC". This proxylet runs a query on the organisation's personnel database.

Condition3: If, because some employees are associated with more than one invention, there are records appearing more than once in the structure returned by Action2 then do Action3.

Action3: Activate and run a proxylet that retrieves the structure returned by Action2 and returns a structure containing distinct records, i.e. it leaves out duplicate records.

Condition4: If the structure returned from Action1 and Action4 are not the same (e.g. Action1 returns the result in a Java vector and Action4 in a Java Array) then do Action5.

Action5: Activate and run a proxylet that transforms the results from the above data structures (i.e. those returned in Action1 and Action4) into a common data structure (e.g. a Java vector).

Action6: Activate and run a proxylet that joins together the structures returned from Action5. Return a new structure (e.g. a Java Vector) containing the fields "Name of Employee, OUC, Case File Number".

Action7: The DS generates an event called ResultsObtained that contains the results of Action7 expressed in XML. Based on this event the DS searches the policy store and retrieves a set of relevant policies (Policy2 and Policy3 below). These policies determine how the results are to be presented to the user who initially sent the query.

POLICY2

Condition 1: If the enquiry is from a client in IPD . . .

Action1: Activate and run a proxylet that unwraps the data from the ResultsObtained event, produces a new structure (e.g. a java vector) containing the OUC and the case file numbers associated with each OUC (in this structure, each OUC will appear only once and each OUC will have associated with it one or more case file numbers) and populates the graphical user interface (GUI) at the client side with a table showing the results in two columns, one containing the OUC and one containing the associated case file numbers.

POLICY3

Condition1: If the enquiry is from a client in OUC ABC123 . . .

Action1: Activate and run a proxylet that unwraps the data from the ResultsObtained event, selects records containing the OUC "ABC123", produces a new structure (e.g. a java vector) containing the fields "Name of Employee" and "Case File Number" and populates ABC123's web page with a table showing the results in two columns.

The DS decides whether to execute POLICY2 or POLICY3 based on the user who sent the query.

The benefit of using the DS over a Mediator or FDBMS based approach is that all the processing requirements are declared through a policy and the processing is executed by pieces of code (i.e. proxylets) that are dynamically invoked on demand.

A Mediator based approach would implement explicitly all the rules of the described policy. That is to say the policy rules would have the form of a program which actually constitutes the Mediator's implementation. Every time a slight change to the rules is necessary, this would mean having to change the Mediator's implementation (i.e. amend the program code, recompile it and redeploy it) or having to implement a new mediator that inherits the characteristics of the old one and provides the additional specific changes. This would result in complex interrelationships between Mediators and lead eventually to a very complex and highly coupled Mediator infrastructure. For the DS, changing the rules only means changing the XML specification of the policy, i.e. changing the current policy or creating a new policy. Hence, the DS is more flexible than a Mediator based approach.

An FDBMS based approach would have had to firstly produce a new, integrated schema from both the data schemata of IPD's internal records database and the data schemata of the organisation's personnel database. Only then could the whole query be run. Using the DS, the integration is achieved by implementing the described policy in the DS and hence there is no requirement to carry out a physical integration of the data.

The invention claimed is:

1. A method of operating a computer system in order to retrieve information from two or more heterogeneous distributed databases of different formats, said computer system including a policy store storing one or more policies, said method comprising:
   providing a user interface to said policy store enabling user configuration of said policy store with one or more policies;
   each policy declaring one or more software modules required for processing a query;
   wherein each software module is operable to interact with one of said heterogeneous databases in order to retrieve said information;
   receiving a query detailing information derivable from two or more of said databases;
   responsive to receipt of said query:
      a) searching in the policy store for one or more policies associated with said query and
      b) running the software modules declared in the one or more policies in order to retrieve said information from the two or more of said plurality of databases.

2. A method according to claim 1, wherein the policy declares the name and the location of the software module.

3. A method according to claim 1, wherein the policy declares the software module itself.

4. A method according to claim 1 further comprising the step of running a default software module to interact with one or more of said heterogeneous distributed databases if no policy associating a software module with said received query is found.

5. A method according to claim 1, wherein providing said user interface to said policy store comprises storing a policy associating a predetermined query with a software module executable to interact with said policy store to introduce a further policy contained within said query into said policy store.

6. A method according to claim 5 wherein said further policy replaces an existing policy.

7. A method according to claim 1 wherein said policies are expressed in the form of text.

8. A method according to claim 7 wherein said policies are preparable using a text editor.

9. A method according to claim 1 wherein said policies are indicative of a time after which said policies should no longer be applied.

10. A method according to claim 1 wherein each one of said plurality of databases has a different data handler.

11. A method according to claim 1 wherein said policy store user interface is restricted to a certain class of user.

12. A method according to claim 1 wherein the heterogeneous distributed database user interface is available to a different set of users from those able to modify said policies in said policy store.

13. A method according to claim 1 wherein said computer system comprises a plurality of computers in communication with one another, the software modules being run on a different computer to the one that receives said query.

14. A method according to claim 1 wherein said computer system comprises a plurality of computers in communication with one another, the policy store being on a different computer to the one that receives said query.

15. A computer system operable to provide a user interface to a heterogeneous distributed database including a plurality of databases of a different format in order to retrieve information from two or more of said databases, said computer system comprising:
   a heterogeneous distributed database;
   a policy store;
   a user interface to said policy store operable to enable a user to configure said policy store with one or more policies, wherein each policy declares one or more software modules required for processing a query and wherein each software module is operable to interact with one of said heterogeneous distributed databases in order to retrieve said information;
   query receiving means arranged in operation to receive a query detailing information derivable from two or more of said databases;
   policy store searching means operable to search said policy store for a policy associating said query with one or more software modules; and
   software module running means operable to run the software modules declared in the policy in order to retrieve said information from the two or more of said plurality of databases.

16. A digital data carrier carrying a program of instructions executable by processing apparatus to perform the method steps as set out in claim 1.

17. A method of operating a computer system to provide a user interface to a heterogeneous distributed database including a plurality of databases of a different format in order to retrieve information from two or more of said databases, said computer system including a policy store storing one or more policies, each policy declaring one or more software modules required for processing a query, said method comprising:
   providing a user interface to said policy store enabling the modification of said policies in said policy store;
   receiving a query detailing information derivable from two or more of said databases;
   responsive to the receipt of said query:
      a) finding a policy in said policy store associating one or more software modules with the query; and
      b) running the one or more software modules declared in the policy in order to retrieve said information from the two or more of said plurality of databases.

18. A method according to claim 17 further comprising storing one or more policies in said policy store.

19. A computer system for providing a user interface to a heterogeneous distributed database including a plurality of databases of a different format in order to retrieve information from two or more of said databases, said computer system comprising:
   a heterogeneous distributed database;

storing means arranged in operation to store one or more policies, each policy declaring one or more software modules required for processing a query;

means arranged in operation to provide a user interface to said policy store enabling the modification of said policies in said policy store;

receiving means arranged in operation to receive a query detailing information derivable from two or more of said databases;

finding means arranged in operation to find a policy in said policy store associating one or more software modules with the query; and running means arranged in operation to run said one or more software modules in order to retrieve said information from the two or more of said plurality of database.

\* \* \* \* \*